(12) United States Patent
Takayama

(10) Patent No.: US 6,745,233 B1
(45) Date of Patent: Jun. 1, 2004

(54) DATA TRANSFER TECHNIQUE FOR DISTRIBUTED MEMORY TYPE PARALLEL COMPUTER

(75) Inventor: Katsunori Takayama, Sizuoka (JP)

(73) Assignee: Fujitsu Limited, Kawaski (JP)

( * ) Notice: Subject to any disclaimer, the term of this patent is extended or adjusted under 35 U.S.C. 154(b) by 709 days.

(21) Appl. No.: 09/639,765

(22) Filed: Aug. 15, 2000

(30) Foreign Application Priority Data

Sep. 28, 1999 (JP) .......................................... 11-273903

(51) Int. Cl.$^7$ ............................................ G06F 15/167
(52) U.S. Cl. ........................ 709/213; 709/207; 709/214; 710/20; 711/145
(58) Field of Search .............................. 709/207, 213, 709/214; 710/20; 711/145

(56) References Cited

U.S. PATENT DOCUMENTS

| | | | | | |
|---|---|---|---|---|---|
| 5,109,330 | A | * | 4/1992 | Pfeiffer et al. | 711/151 |
| 5,386,566 | A | * | 1/1995 | Hamanaka et al. | 719/310 |
| 5,566,349 | A | * | 10/1996 | Trout | 710/20 |
| 5,649,102 | A | * | 7/1997 | Yamauchi et al. | 709/213 |
| 5,987,506 | A | * | 11/1999 | Carter et al. | 709/213 |
| 6,119,150 | A | * | 9/2000 | Fujii et al. | 709/213 |
| 6,167,437 | A | * | 12/2000 | Stevens et al. | 709/214 |
| 6,167,489 | A | * | 12/2000 | Bauman et al. | 711/145 |
| 6,295,553 | B1 | * | 9/2001 | Gilbertson et al. | 709/207 |
| 6,418,517 | B1 | * | 7/2002 | McKenney et al. | 711/151 |
| 6,490,661 | B1 | * | 12/2002 | Keller et al. | 711/150 |

FOREIGN PATENT DOCUMENTS

| | | |
|---|---|---|
| JP | 4-167191 | 6/1992 |
| JP | 7-114508 | 5/1995 |

* cited by examiner

Primary Examiner—Wen-Tai Lin
(74) Attorney, Agent, or Firm—Staas & Halsey LLP

(57) ABSTRACT

The object of the present invention is to speed up data transfer between processes required when there is a variable duplicatively assigned to a plurality of processes (duplicatively assigned variable) and any process among the plurality of processes substitutes data into the duplicatively assigned variable. In a distributed memory type parallel computer for executing a plurality of processes using a plurality processing devices connected via a communication network, each of the processing devices for executing at least one process among the plurality of processes comprises a scheduler for scheduling data transfer of the substituted data to each process if the process substitutes data into a variable a duplicatively assigned throughout the plurality of processes, and transfer means for carrying out data transfer via the communication network in accordance with the scheduler. Appropriate scheduling speeds up data transfer. It is also possible to carry out data transfer to the process itself via a communication network on behalf of the substitution processing.

11 Claims, 13 Drawing Sheets address arrangement for variable b (process 1)

DATA TRANSFER TECHNIQUE FOR DISTRIBUTED MEMORY TYPE PARALLEL COMPUTER

TECHNICAL FIELD OF THE INVENTION

The present invention relates to a distributed memory type parallel computer, more particularly to a technique for transferring data between processes executed by the distributed memory type parallel computer.

BACKGROUND OF THE INVENTION

A distributed memory type parallel computers having a plurality of processor elements, which comprise a memory and a CPU (Central Processing Unit), connected by a communication network have been used in order to execute a program written in a language for handling large amounts of data (such as Fortran) at high speed.

SUMMARY OF THE INVENTION

A distributed memory type parallel computer can execute a plurality of processes in parallel. However, the plurality of processes can not be processed independently. For example, when there is a variable that is duplicatively assigned throughout the plurality of processes (hereinafter called a duplicatively assigned variable) and any of the plurality of processes substitutes data into the duplicatively assigned variable, it is necessary to make the data in the duplicatively assigned variable for all processes identical. In order to make the data identical for all processes, data transfer must be carried out between the processes.

The object of the present invention is to provide a technique for high-speed data transfer between processes if substituting data into the duplicatively assigned variable.

A first aspect of the present invention is directed to a distributed memory type parallel computer for executing a plurality of processes using a plurality of processing devices connected by a communication network. Each of the processing devices for executing at least one process among the plurality of processes has a scheduler for scheduling data transfer of the substituted data to each process if the process substitutes data into a variable duplicatively assigned throughout the plurality of processes, and a communication controller for carrying out data transfer via the communication network in accordance with the scheduler. With suitable scheduling, data transfer is speeded up.

It is possible to configure the communication controller to transmit the substituted data to the process itself via the communication network on behalf of the substitution by the process. Since there are often cases where a data address arrangement becomes complicated if a duplicatively assigned variable is a high dimensional array variable, data transfer via a communication network is effective rather than memory transfer. The communication controller can be configured to perform packet transfer, for example.

It is also possible to configure each processing device described above to further comprise a generator for generating information relating to data transfer. The information is commonly used by the communication controller if transferring data to each process. By using the characteristic that a duplicatively assigned variable has the same structure in each process, the information relating to data transfer is used in data transfer to all processes.

It is also possible to configure the information relating to data transfer to include a base address and address arrangement information for the substituted data. In this way, data transferred to each process can be simply read out. It is also possible to configure the information to further include a base address and address arrangement information for the destination process. In this way, storage of data at the destination process can be carried out easily. The address arrangement information includes a movement distance between array elements (also called access length) and the number of repetitions (the number of array elements for each dimension), for example.

It is also possible to configure the scheduler described above to schedule data transfer to be carried out on behalf of the data substitution process by the process. Data transfer to an own process is also effective in cases where data transfer is carried out via a communication network.

It is also possible to configure the scheduler described above to carry out scheduling, if there are a plurality of substituting processes that substitute data into a variable duplicatively assigned throughout the plurality of processes, so as to avoid the duplication of destination process of the substituting processes. If the destination process is duplicated, it is ineffective because data transfer processing becomes sequential, and data transfer is slowed down overall.

For example, if an identification number is appended to each of the plurality of processes, and the scheduler determines destination processes in ascending or descending order of the identification number based on the identification number of the substituting process, the destination process is not duplicated and data transfer is speeded up.

A second aspect of the present invention is directed to a program for a distributed memory type parallel computer for executing a plurality of processes using a plurality of processing devices connected via a communication network. The program causes a processing device for carrying out at least one of the plurality of processes to perform the steps of: scheduling data transfer of the substituted data to each of process if the process substitutes data into a variable duplicatively assigned throughout the plurality of processes, and instructing data transfer via the communication network in accordance with the scheduling.

A modification of the first aspect of the present invention can be applied to this program for a distributed memory type parallel computer. Also, the program can be stored in a storage medium or storage device such as a floppy disk, a CD-ROM, a magneto-optical disk, semiconductor memory or hard disk.

BRIEF DESCRIPTION OF THE DRAWINGS

FIG. 12 is a schematic drawing for describing an address arrangement for variable a;

DETAILED DESCRIPTION OF THE PREFERRED EMBODIMENTS

Figure 1:
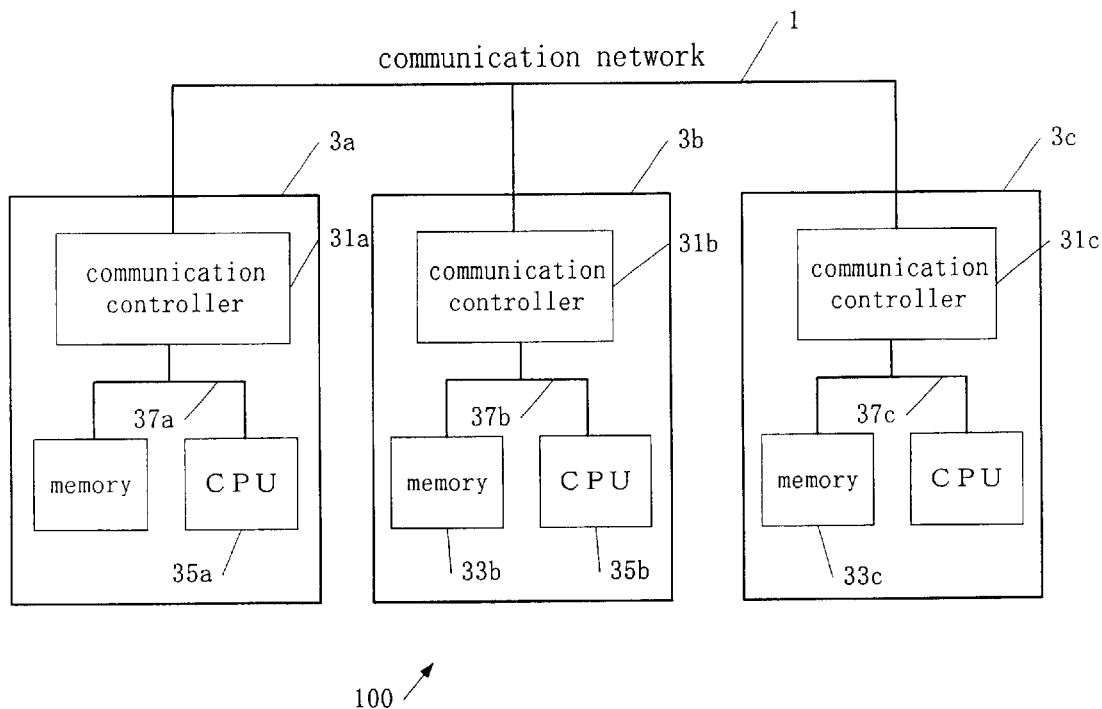
FIG. 1 is a block diagram showing an outline of a distributed memory type parallel computer in the embodiment.

One example of a distributed memory type parallel computer 100 is shown in FIG. 1. The distributed memory type parallel computer 100 has processor elements 3a, processor elements 3b and processor elements 3c connected via a communication network 1. Only three processor elements are shown in this example, but it is also possible to have a configuration where more than three processor elements are connected, and it is also possible to have a two processor element configuration. Each processor element 3 contains a communication controller 31 for carrying out communication via the communication network 1, and a memory 33 and CPU 35 connected to the communication controller 31. In FIG. 1, respective elements inside the processor element 3a are suffixed with a, respective elements inside the processor element 3b are suffixed with b, and respective elements inside the processor element 3c are suffixed with c. Accordingly, the processor element 3a includes a communication controller 31a, memory 33a and CPU 35a, the processor element 3b includes a communication controller 31b, memory 33b and CPU 35b, and the processor element 3c includes a communication controller 31c, memory 33c and CPU 35c.

Memory 33 is included in each processor element 3 of the distributed memory type parallel computer 100, and the CPU 53 inside each processor element 3 is capable of performing different processings using the memory 33. As a typical example, one processor element executes one process, but there are cases where one processor element executes a plurality of processes.

The communication controller 31 is used, for example, in data transfer processing, if there is a variable duplicatively assigned across a plurality of related processes (duplicatively assigned variable) and data is input to the duplicatively assigned variable by any one of the plurality of related processes, in order to make data in the duplicatively assigned variable identical for all related processes. However, the communication controller 31 is not used only in this type of situation, but also, for example, to tabulate calculation results of each processor element 3.

The distributed memory type parallel computer 100 often performs high dimensional array computations. Transfer of partial data inside high dimensional arrays also arises even in the communication between the processor elements 3. Some of the data in this array is distributively allocated in the memory 33, and this distributively allocated data must be transferred at high speed. This communication controller 31 is configured so as to enable high-speed transfer of distributively allocated data.

For example, if a CPU 35 inside a source processor element 3 has written the name of the destination processor element (or the name of the destination process), transfer size, source base address, source address arrangement (data representing what order data to be read out is arranged), destination base address and destination address arrangement (data indicating the order in which data is to be written) into the memory 33 as communication information, the communication controller 31 of the transmitting side reads data to be transmitted from the source base address according to the source address arrangement, and generates a packet with a header comprising the destination processor element name, transfer size, destination base address and destination address arrangement. The source communication controller 31 then transfers this packet to the destination processor element via the communication network 1.

If the communication controller 31 inside the receiving side processor element 3 receives the packet, received data is written from the destination base address indicated in the header of the packet into the receiving side memory 33 according to the destination address arrangement. In doing this, communication between processor elements 3 is carried out at high speed even if, for example, data to be transferred is distributively allocated in memory. Not only is communication between different processor elements possible, but it is also possible to transmit a packet to the same processor element itself. Processing described here is described in detail in Japanese Patent Laid-open No. Hei 4-167191.

Next, processing for substituting data in a variable duplicatively assigned across a plurality of variables will be described. In order to simplify the description, a case will be given for only two processor elements, and one process is executed in each processor element. Specifically, a process 0 is executed in processor element 0, and a process 1 is executed in processor element 1. Also, there is a duplicatively assigned variable b, and variable b is substituted with data from a variable a distributively assigned to process 0 and process 1. Distributively assigned means that data is distributively processed in each process.

Figure 2:
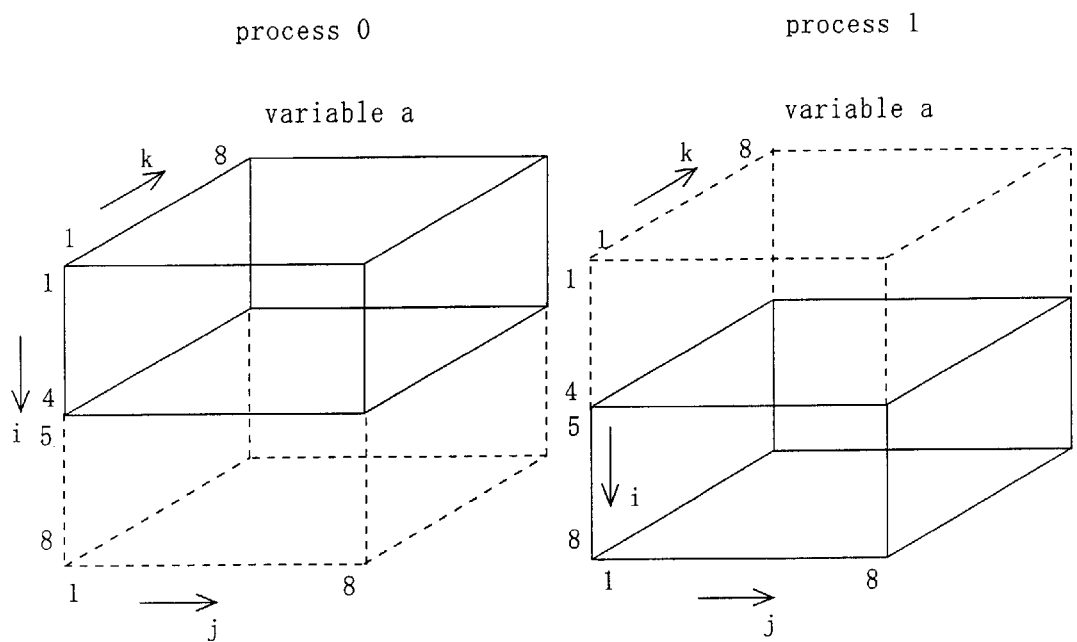
FIG. 2 is a schematic drawings showing variable a distributively assigned across process 0 and process 1.

FIG. 2 schematically shows distributively assigned data for variable a. Here, variable a is a three dimensional array having a length of 8 (from k=1 to k=8), a width of 8 (from j=1 to j=8) and a height of 8 (from i=1 to i=8). This variable a is distributively assigned in the height direction to process 0 and process 1. A portion from height 1 to 4 (from i=1 to i=4) is assigned to process 0 and a portion from height 5 to 8 (from i=5 to i=8) is assigned to process 1. In FIG. 2, a rectangular parallelepiped section drawn by a solid line represents a data portion assigned to that process. An upper half (i=1 to 4) of variable a is assigned to process 0, while a lower half (i=5 to 8) of variable a is assigned to process 1.

Figure 3:
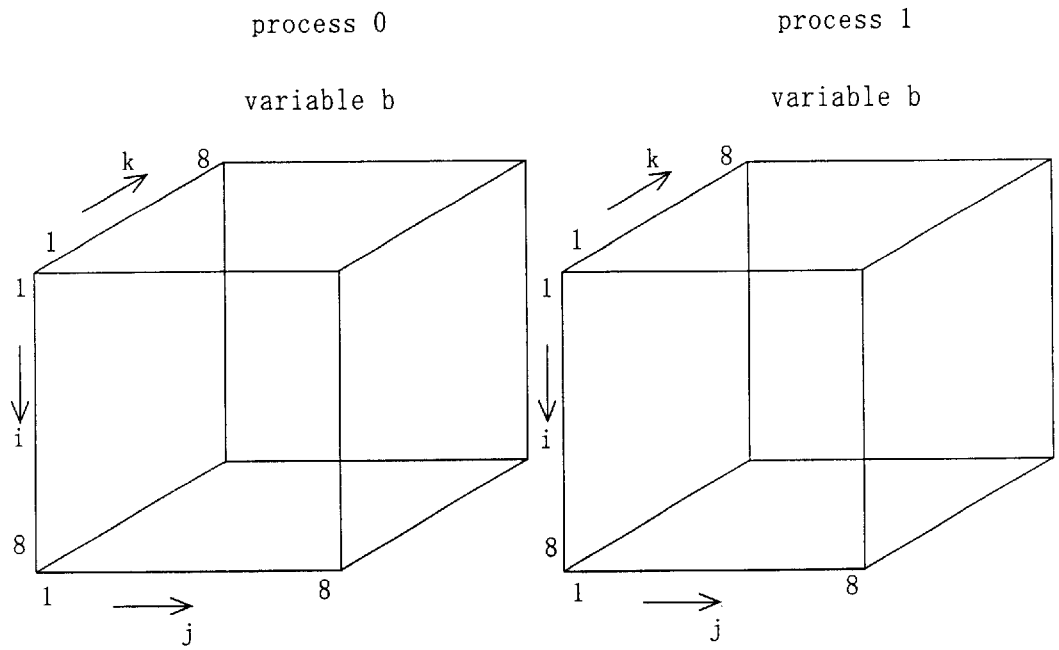
FIG. 3 is a schematic drawing showing variable b duplicatively assigned to process 0 and process 1.

On the other hand, FIG. 3 schematically shows data for a duplicatively assigned variable b. Here, variable b is a three dimensional array having a length of 8 (from k=1 to k=8), a width of 8 (from j=1 to j=8) and a height of 8 (from i=1 to i=8). In FIG. 3, data in the variable b for process 0 and data in the variable b for process 1 have the same arrangement. Duplicatively assigned means that data having the same data structure exist in each process, and the data-content is also identical.

With this prerequisite, an example will be given in the following of a program (written in HPF: High Performance Fortran) for substituting data in variable a into duplicatively assigned variable b. Line numbers on the left are only for the purposes of explanation.

```
01 Program Main
02 !hpf$ processors p(2)
03 integer, dimension (8, 8, 8):: a, b
04 !hpf$ template t (8, 8, 8)
05 !hpf$ distribute t (block, *, *) onto p
06 !hpf$ align a (i, j, k) with t (i, j, k)
07 !hpf$ asyncid id
08 !hpf$ asynchronous (id)
09 forall (i=1:8:2, j=1:8:1, k=2:8:2) b (i, j, k)=a (i, j, k)
10 !hpf$ asyncwait(id)
11 end
```

Line 01 represents the start of the program. At line 02, two processors p are defined. At line 03, integer array variables a and b having dimensions 8×8×8 are defined. At line 04, an 8×8×8 template t is defined. Line 05 represents the first dimensional element of template t being distributed by the program to processor p. Since there are two processors p in this case, each 4 (=8 (the number of the first dimensional elements of the template t)/2 (the number of processors)) elements in the first dimension are distributed to the two processors p. Line 06 represents the definition of template t, which is distributed to the two processors p, being applied to the array variable a. Here, as shown in FIG. 2, variable a is distributively assigned to processor element 0 (process 0) and processor element 1 (process 1). At line 07, an identifier id for asynchronous transfer is obtained. Asynchronous transfer is then carried out between line 08 and line 10 using this identifier id. Line 10 represents that this data transfer between processor elements is assured at this stage. Line 09 represents repetition of b (i, j, k)=a (i, j, k). The value of i is added two at a time from 1 to 8, while the value of j is added one at a time from 1 to 8, and the value of k is added two at a time from 1 to 8. Line 11 represents termination of the program. Such a program is executed in each of process 0 and process 1.

Figure 4:
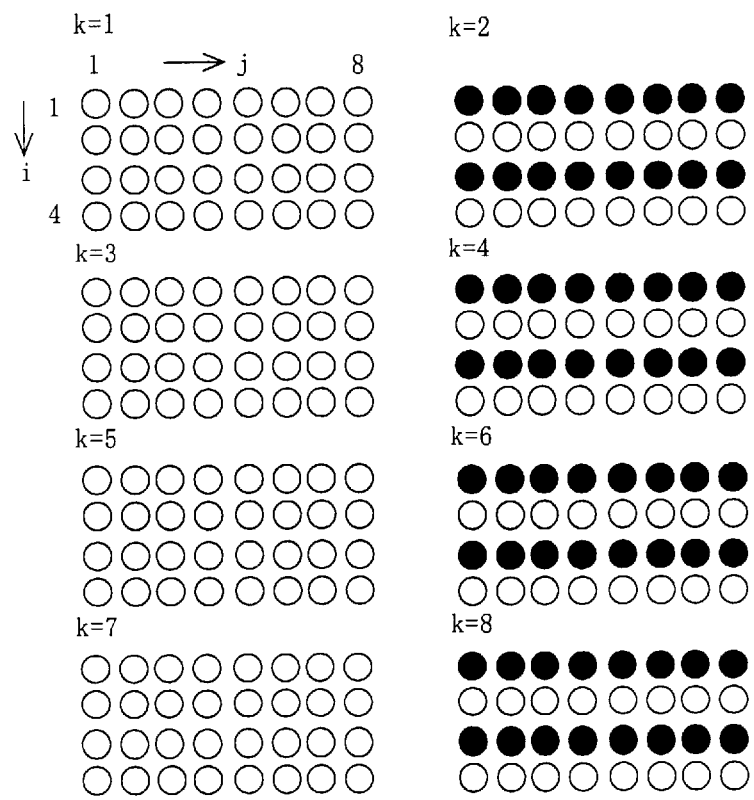
FIG. 4 is a schematic drawing showing a data transfer range of variable a assigned to process 0.

Here, among the sections of variable a assigned to process 0, array elements used in substitution processing of line 9 in the above program are shown in FIG. 4. FIG. 4 shows the solid line parallelepiped of the left side of FIG. 2 cut on a parallel with the plane ij, and arranged for every k. White circles represent elements that are not used in the substitution processing, while black circles represent elements that are used in the substitution processing. There are i×j=4×8= 32 elements of data for each k. In the length direction, the value of i is changed from i=1 to i=4 and in the width direction, the value of j is changed from j=1 to j=8. Since, with respect to k, elements that are used in the substitution processing are every other element from 2 to 8, none of k=1, k=3, k=5 and k=7 are used. Accordingly, they are only white circles. On the other hand, in the case of k=2, k=4, k=6 and k=8, since, with respect to i, elements that are used in the substitution processing are every other element from 1 to 8. Since, with respect to j, every elements used from 1 to 8, all circles in lines for i=1 and i=3.

Figure 5:
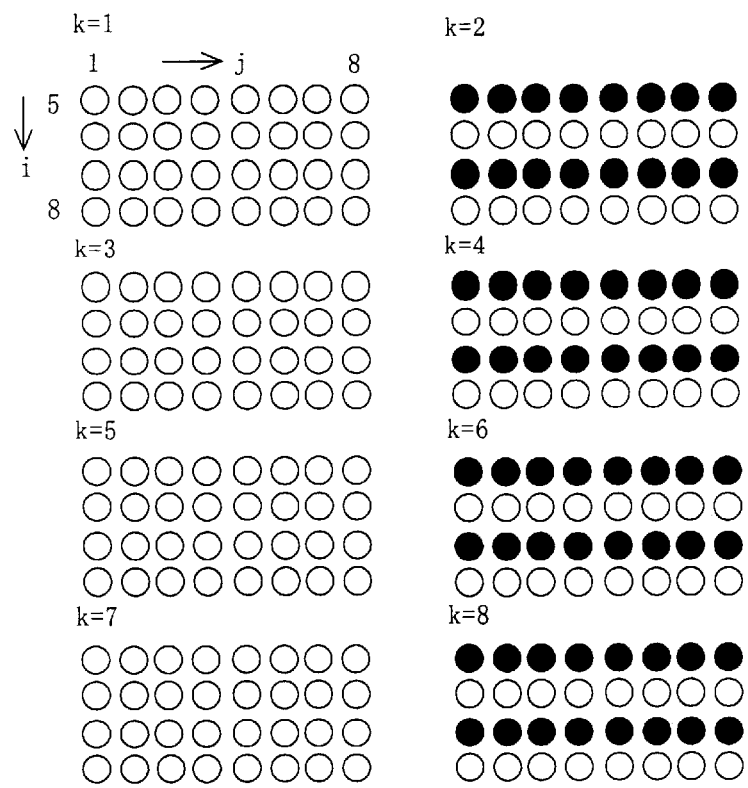
FIG. 5 is a schematic drawing showing a data transfer range of variable a assigned to process 1.

Also, among the sections of variable a assigned to process 1, array elements used in substitution processing of line 9 in the above program are shown in FIG. 5. FIG. 5, similarly to FIG. 4, shows the solid line parallelepiped of the right side of FIG. 2 cut on a parallel with the plane ij and arranged for every k. There are i×j=4×8=32 elements of data for each k. In the length direction, the value of i is changed from i=5 to i=8 and in the width direction, the value of j is changed from j=1 to j=8.

Since, with respect to k, elements that are used in the substitution processing are every other element from 2 to 8, none of k=1, k=3, k=5 and k=7 are used. Accordingly, they are only white circles. On the other hand, in the case of k=2, k=4, k=6 and k=8, since, with respect to i, elements that are used in the substitution processing are every other element from 1 to 8. Since, with respect to j, every elements are used from 1 to 8, all circles in lines for i=5 and i=7 are black.

Figure 6:
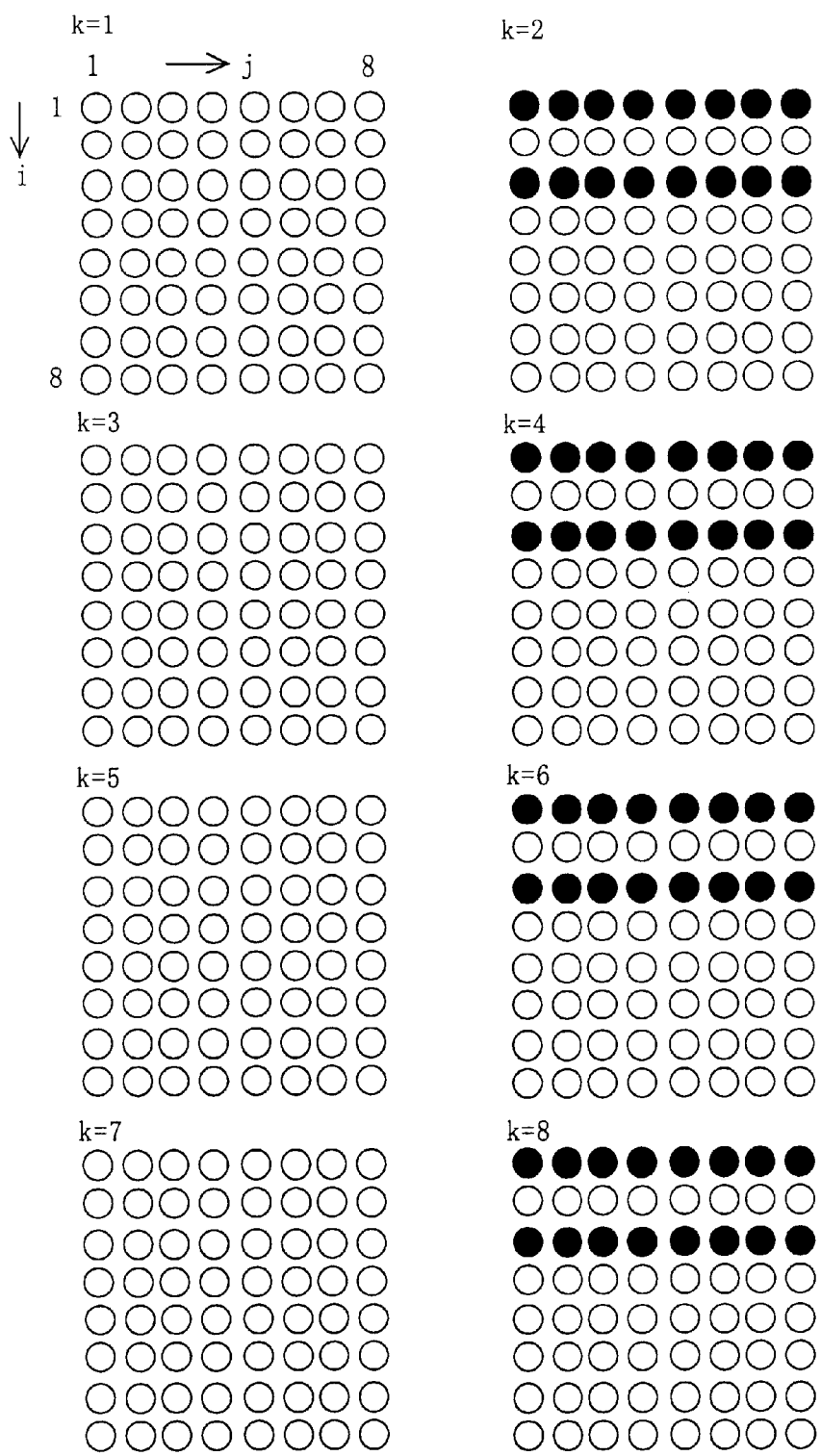
FIG. 6 is a schematic diagram showing a range of data substituted into variable b assigned to process 0.

Among the array elements of variable b processed in process 0, array elements substituted in the substitution processing in line 09 of the above described program are shown in FIG. 6. FIG. 6 shows the cube on the left side of FIG. 3 cut on a parallel with the plane ij and arranged for every k. White circles represent elements not substituted, and black circles represent elements that are substituted. There are i×j=8×8=64 elements of data for each k. In the length direction, the value of i is changed from i=1 to i=8 and in the width direction, the value of j is changed from j=1 to j=8.

With respect to k, elements that are substituted are every other element from 2 to 8, so none of k=1, k=3, k=5 or k=7 are used. Accordingly, they are only white circles. On the other hand, in the case of k =2, k=4, k=6 and k=8, as show in FIG. 4, all of i=1 and i=3 are used, so lines i=1 and i=3 are comprised of all black circles.

Figure 7:
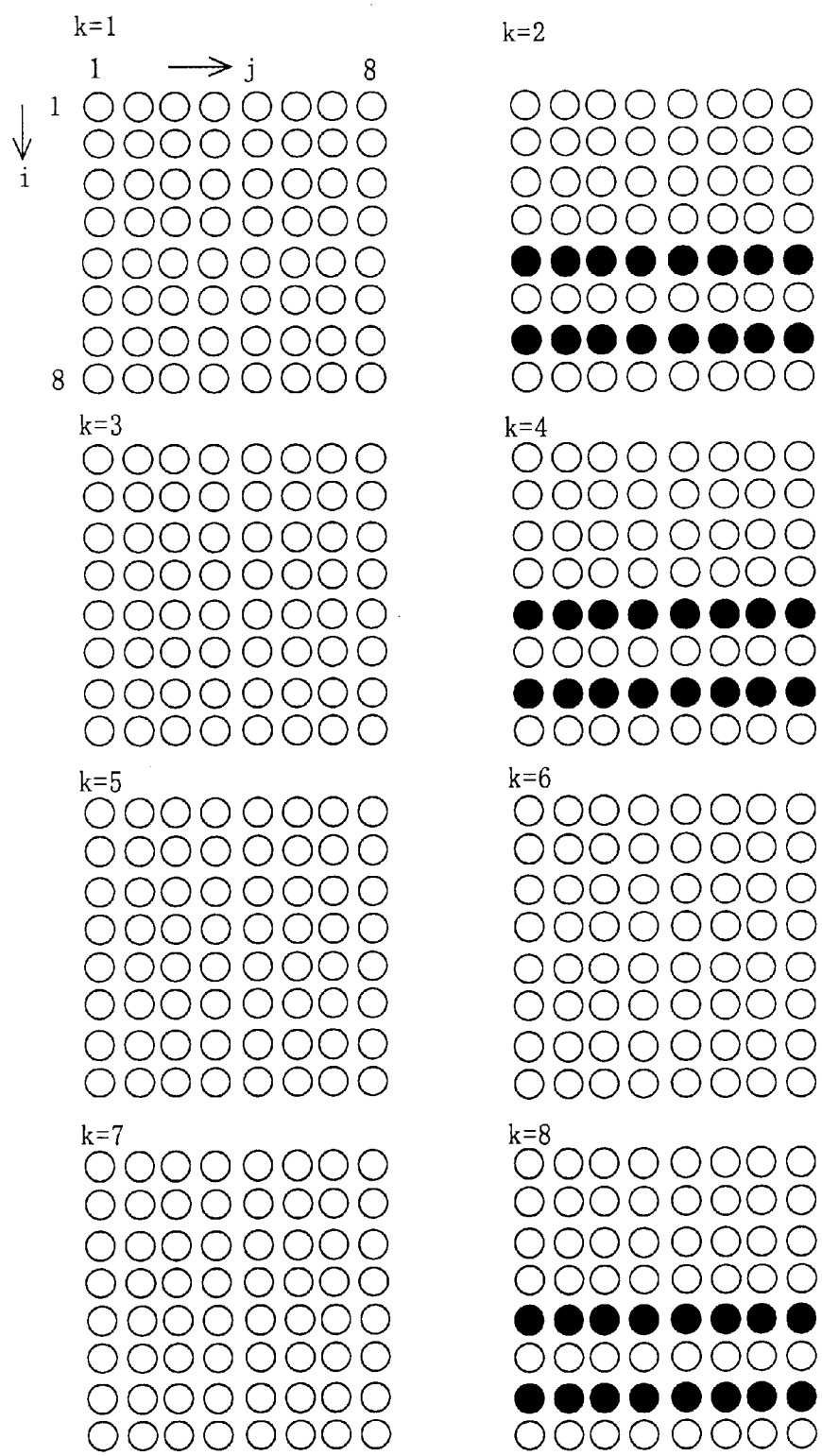
FIG. 7 is a schematic diagram showing a range of data substituted into variable b assigned to process 1.

Among the array elements of variable b processed in process 1, array elements substituted in the substitution processing of line 09 in the above-scribed program are shown in FIG. 7. FIG. 7 shows the cube on the right side of FIG. 3 cut on a parallel with the plane ij and arranged for every k. There are i×j=8×8=64 elements of data for each k. In the length direction, the value of i is changed from i=1 to i=8 and in the width direction, the value of j is changed from j=1 to j=8.

With respect to k, elements that are substituted are every other element from 2 to 8, so none of k=1, k=3, k=5 or k=7 are used. Accordingly, they are only white circles. On the other hand, in the case of k =2, k=4, k=6 and k=8, as show in FIG. 5, all of i=5 and i =7 are used, and so lines i=5 and i=7 are comprised of all black circles.

Figure 8:
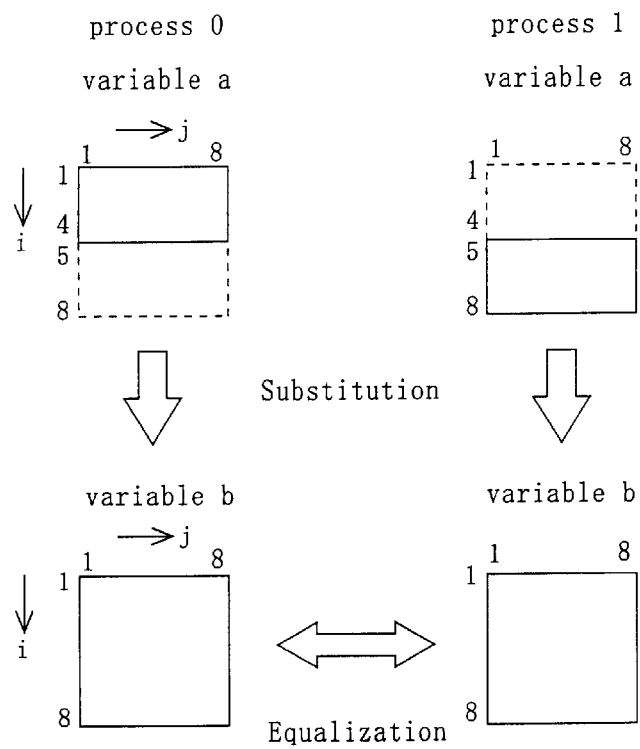
FIG. 8 is a drawing schematically showing a relationship between variable a and variable b in process 0 and variable a and variable b in process 1.

Here, the substitution processing from variable a into variable b of line 09 in the above described program will be summarized using FIG. 8. The part of variable a assigned to process 0, as shown by the solid line at the upper left in FIG. 8, is the part from i=1 to i=4 (with respect to jk, all of them). This part is substituted into variable b processed in process 0. With respect to variable b, only ij is shown. On the other hand, the part of variable a assigned to process 1, as shown by the solid line at the upper right in FIG. 8, is the part from i=5 to i=8 (with respect to jk, all of them). This part is substituted into variable b processed in process 1. With respect to this variable b, only ij is shown. However, variable b is a duplicatively assigned variable, which means that variable b for process 0 and variable b for process 1 must be made identical.

With respect to substitution processing within the same process, since this is processing within the same processor element it is possible to execute substitution processing by carrying out memory transfer. However, as shown in FIG. 4 to FIG. 7, data to be read for substitution processing and the write destination address are distributed in the memory. This means that if vector memory processing or the like, capable of high-speed transfer of blocked continuous memory regions, is used, transfer is carried out for every block and transfer efficiency becomes bad.

On the other hand, in order to make variable b in process 0 and variable b in process 1 identical, it is necessary to carry out data transfer to memory space of other processes that are physically separated, via a communication network.

Figure 9:
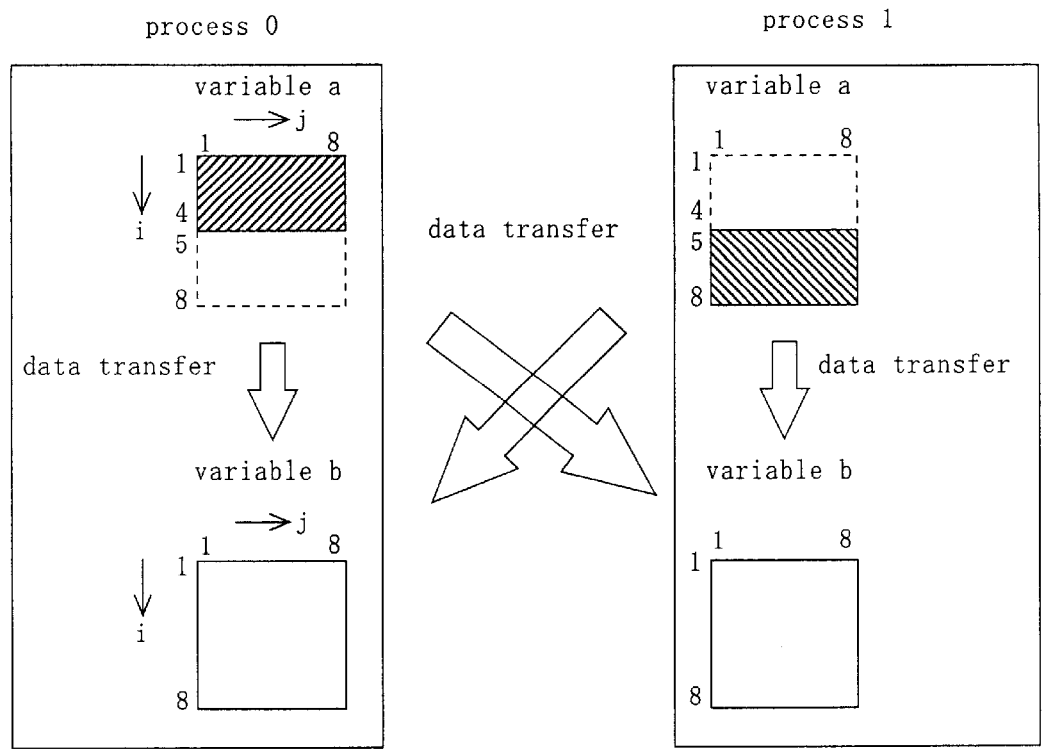
FIG. 9 is a drawing schematically showing data transfer to be carried out in the embodiment.

Therefore, in the present embodiment, as shown schematically in FIG. 9, a processing of substituting a part of variable a assigned to process 0 into variable b of process 0, and a processing of substituting a part of variable a assigned to process 1 into variable b of process 1 is replaced by data transfer via the communication network. With the communication controller 31 as previously described, it is possible to transfer data dispersively allocated on the memory at a faster speed, which makes data transfer efficient. Respective parts to which diagonal lines are attached in variable a are assigned to respective processes. A range from i=1 to i=4 (for jk, all of them) is assigned to process 0, and a range from i=5 to i=8 (for jk, all of them) is assigned to process 1. Only ij is shown for variable b.

Figure 10:
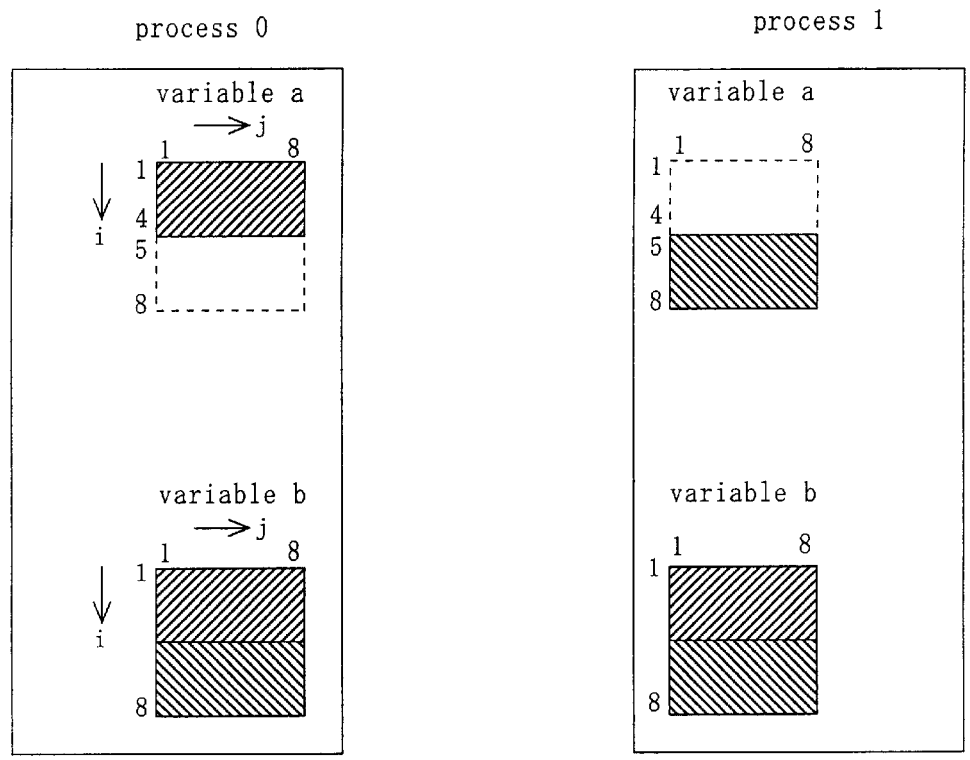
FIG. 10 is a schematic drawing showing elements after data transfer to be carried out in the embodiment has been competed.

On the other hand, data transfer between processes in order to achieve equalization can be done through high-speed data transfer if the above described communication controller 31 is similarly used. As shown in FIG. 9, data in variable a assigned to process 0 that is used for substitution processing is transferred to variable b in process 1, and data in variable a assigned to process 1 that is used for substitution processing is transferred to variable b in process 0. Specifically, data transfer is carried out in a crossover fashion. Data in variable a and variable b after data transfer are shown schematically in FIG. 10. Slanted lines representing part of variable a assigned to process 0 are copied to the upper halves of variable b in process 0 and process 1, while in a similar manner slanted lines representing part of variable a assigned to process 1 are copied to the lower halves of variable b in process 0 and process 1. In this way, substitution processing and equalization processing are completed.

However, data used for substitution processing among part of the variable a assigned to process 0 is the same as data transferred to process 1. Also, data used for substitution processing among part of the variable a assigned to process 1 is the same as data transferred to process 0. Particularly, since in the present embodiment as described above, the substitution processing is replaced with the data transfer to own process, data transfer to be prepared by any of the processes can be commonly used for all destination.

With the above-described program, there were only two processing elements. In this case, there is no considerable effect on the data transfer via the communication network even if transmission collisions occur. However, in actual fact a plurality of processes will be executed in a plurality of processor elements, which means that data transfer may be concentrated to an arbitrary process. In such a case, efficiency is bad because data transfer processing becomes sequential. This means that the efficiency becomes worse as the data amount per data transfer increases.

For example, in the case where processing like that in line 09 of the program described above is executed, processing like that in FIG. 11 is executed in each process.

First of all, a data transfer range of the source process (source data transfer range) is calculated (Step S103). This source data transfer range can be calculated from the range of repetition in line 09 (in the above described program [i=1:8:2, j=1:8:1, k=2:8:2]) a part of variable a assigned to each process, and substitution sentence (b(i,j,k)=a(i,j,k)). If we look at the substitution sentence (b(i,j,k)=a(i,j,k)), it will be seen that element locations within the retrieved variable a are the same as element locations within variable b to be substituted. Therefore, in this example there is no effect from the substitute sentence. Accordingly, with respect to process 0 and variable a (i,j,k), the source data transfer range is every other element from i=1 to i=3, every elements from j=1 to j=8, and every other element from k=2 to k=8. It can be represented as [i=1:3:2, j=1:8:1, k=2:8:2]. With respect to process 1 and variable a (i,j,k), the source data transfer range is every other element from i=5 to i=7, every elements from j=1 to j=8, and every other element from k=2 to k=8. It can be represented as [i=5:7:2, j=1:8:1, k=2:8:2]. These are the same as shown in FIG. 4 and FIG. 5.

Next, a destination data transfer range is calculated (step S105). The destination data transfer range can be calculated from substitution sentence (in the above described program b(i,j,k)=a(i,j,k)) and the source data transfer range. If we look at the substitution sentence (b(i,j,k)=a(i,j,k)), it will be seen that element locations within the retrieved variable a are the same as element locations within variable b to be substituted. Therefore, in this example there is no effect from the substitution sentence. Accordingly, the destination data transfer range becomes the same as the source data transfer range. Accordingly, with respect to process 0 and variable a (i,j,k), the source data transfer range is every other element from i=1 to i=3, every elements from j=1 to j=8, and every other element from k=2 to k=8. It can be represented as [i=1:3:2, j=1:8:1, k=2:8:2]. With respect to process 1 and variable a (i,j,k), the source data transfer range is every other element from i=5 to i=7, every elements from j=1 to j=8, and every other element from k=2 to k=8. It can be represented as [i=5:7:2, j=1:8:1, k=2:8:2]. These are the same as shown in FIG. 6 and FIG. 7.

The source data transfer range is then converted to an address arrangement (step S109). FIG. 4 and FIG. 5 schematically show each element within an array in order to make it easy to understand that it is a three dimensional array. In actual fact, if data transfer is carried out, each element in the array is arranged in one dimension, and it is necessary to know which data are to be read out from within that one-dimensional row. This is the information for the address arrangement.

Figure 12:
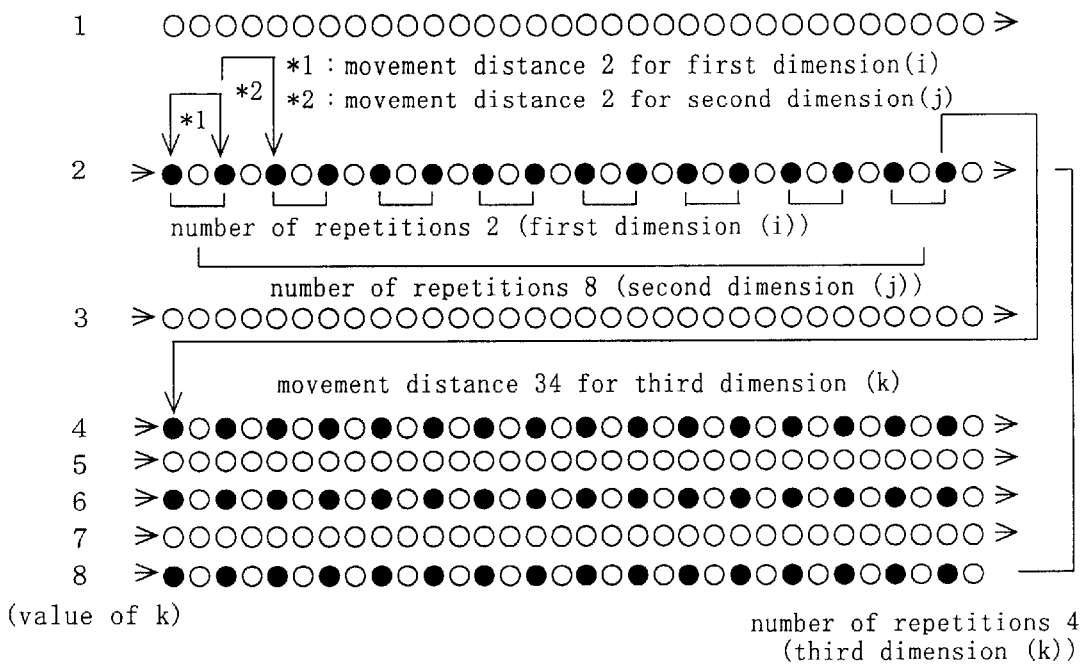

FIG. 12 is a drawing for describing the address arrangement for variable a. In FIG. 4, elements from i=1 to i=4 are read out while j=1 and k=1. Next, elements from i=1 to i=4 are read out while j=2 and k=1. Next, elements from i=1 to i=4 are read out while j=3 and k=1. Such processings are repeated from j=1 to j=8 and from k=1 to k=8. Accordingly, the final state is shown in FIG. 12. In FIG. 5, elements from i=1 to i=4 are read out while j=1 and k=1. Next, elements from i=1 to i=4 are read out while j=2 and k=1. Next, elements from i=1 to i=4 are read out while j=3 and k=i. Such processings are repeated from j=1 to j=8 and from k=1 to k=8. Accordingly, the final state is also shown in FIG. 12. FIG. 4 and FIG. 5 have the same arrangements of white circles and black circles, and the relationship between white circles and black circles in FIG. 12 is also the same for process 0 and process 1.

The numbers arranged in a vertical column on the left side of FIG. 12 represent the value of k. Arrows to the right of these numbers and arrows on the right edge of FIG. 12 are for showing that data continues to the next line. As will also be understood from FIG. 4 and FIG. 5, when the value of k is an odd number, they all become white circles. On the other hand, when the value of k is an even number, there are alternate black circles and white circles. As described above, if the value of i changes from i=1 to i=4, or from i=5 to i=8, the value of j is changed. Until the value of j is changed, black circles occur every other circle, that is, two black circles appear. Accordingly, the movement distance of the first dimension (i) is 2 (*1 in FIG. 12) and the number of repetitions is 2. Also, an interval between an initial black circle after the value of j has been changed and a final black circle before the value of j is changed is the movement distance of the second dimension 0). Here, the repetition of ●○●○ occurs 8 times until the value of k is changed, which means that the number of repetitions for the second dimension (j) is 8. Further, an interval between an initial black circle after k has been changed and a final black circle before the value of k is changed is the movement distance of the third dimension (k). Here, as shown from the final black circle of the row where k=2 to the initial black circle where k=4, the movement distance is 34. Since lines where there are black circles and lines where there are no black circles repeat 4 times from k=2 to k=8, the number of repetitions of the third dimension (k) is 4. in this way, in this embodiment a movement distance of 2 and the number of repetitions of 2 for the first dimension (i), a movement distance of 2 and the number of repetitions of 8 for the second dimension (j), and a movement distance of 34 and the number of repetitions of 4 for the third dimension (k) are obtained as address arrangement information. The address of the initial black circle then becomes the base address. By obtaining this base address and the address arrangement information, it is possible to simply obtain addresses of black circles to be read out from among elements of the array arranged in the one dimension.

Returning to FIG. 11, next the destination data transfer range is converted to an address arrangement (step S109). Destination address arrangement information is information for simply understanding to what element positions in the one-dimensionally arranged array received data is written.

The address arrangement for variable b in the case where process 0 is the receiving side process will be described using FIG. 13. In FIG. 6, elements are arranged from i=1 to i=8 while j=1 and k=1. Next they are arranged from i=1 to i=8 while j=2 and k=1. Next they are arranged from i=1 to i=8 while j=3 and k=1. Such processings are repeated from j=1 to j=8 and from k=1 to k=8. Accordingly, the final state is shown in FIG. 13.

Figure 13:
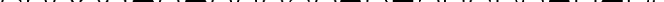
FIG. 13 is a schematic drawing for describing an address arrangement for variable a of process 0.

The alphanumeric characters vertically arranged on the left side of FIG. 13 show what range elements of the array are in each line. For example, j=1–4, k=1 of the first line indicates that that there is a range of k=1 with from j=1 to j=4. Also, j=5–8, k=1 of the second line indicates that there is a range of k=1 with from j=5 to j=8. In each line, the elements from i=1 to i=8 are all included. Arrows to the right of the alphanumeric characters and on the right side of FIG. 13 show that data continues in each line.

As shown in FIG. 6, when the value of k is an odd number there are only white circles. In FIG. 13, the value of k is changed every two lines, which means that two lines having only white circles last. As shown in the third line of FIG. 13, there are black circles from i=1 to i=8 when i=1 and i=3. The distance between i=1 and i=3 is the movement distance of the first dimension (i), and it will be understood that this is a movement distance 2 as shown by *1 in FIG. 13. Also, since there are only two black circles until the value of j is changed, the number of repetitions for the first dimension (i) is 2. A distance between an initial black circle after j has been updated and a final black circle before the value of j is updated is the movement distance of the second dimension, and it will be understood that this is a movement distance 6 as shown by *2 in FIG. 13. The number of repetitions of ●○●○○○○○ is 8 times until the value of k is updated (between two lines in FIG. 13), and so the number of repetitions for the second dimension 0) is 8. Further, a distance from an initial black circle after k has been changed to a final black circle before the value of k is changed is the movement distance of the third dimension (k), and it will be understood that this is 70 here. Two lines in which there are black circles are repeated similarly 4 times, and so the number of repetitions for the third dimension (k) is 4.

In this embodiment, a movement distance of 2 and the number of repetitions of 2 for the first dimension (i), a movement distance of 6 and the number of repetitions of 8 for the second dimension (j), and a movement distance of 70 and the number of repetitions of 4 for the third dimension (k), are obtained as address arrangement information. The address of the initial black circle is then the base address. By obtaining the base address and address arrangement information, it is possible to simply obtain addresses of black circles to be written within the one-dimensionally arranged array elements.

Figure 14:
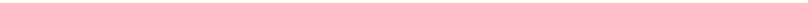
FIG. 14 is a schematic drawing for describing an address arrangement for variable a of process 1.
Figure 14:
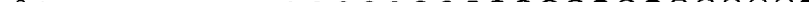

The address arrangement for variable b in the case where process 1 is the receiving side process will be described using FIG. 14. In FIG. 7, elements are arranged from i=1 to i=8 while j=1 and k=1. Next they are arranged from i=1 to i=8 while j=2 and k=1. Next they are arranged from i=1 to i=8 while j=3 and k=1. Such processings are repeated from j=1 to j=8 and from k=1 to k=8. Accordingly, the final state is shown in FIG. 14. The system of notation in FIG. 14 is the same as that in FIG. 13.

As shown in FIG. 7, when the value of k is an odd number there are only white circles. In FIG. 14, the value of k is changed at intervals of two lines, which means that two lines having only white circles last. As shown in the third line of FIG. 14, there are black circles from i=1 to i=8 when i =5 and i=7. The distance between i=5 and i=7 is the movement distance of the first dimension (i), and it will be understood that this is the movement distance 2 as shown by *1 in FIG. 14. Also, since there are only two black circles until the value of j is changed, the number of repetitions for the first dimension (i) is 2. A distance between an initial black circle after j has been updated and a final black circle before the value of j is updated is the movement distance of the second dimension (j), and it will be understood that this is the movement distance 6 as shown by *2 in FIG. 14.

The number of repetitions of ○○○○●○●○ is 8 times until the value of k is updated (between two lines in FIG. 14), and so the number of repetitions for the second dimension (j) is 8. Further, a distance from an initial black circle after k has been changed to a final black circle before the value of k is changed is the movement distance of the third dimension (k), and it will be understood that this is 70 here. Lines in which there are black circles are repeated similarly 4 times, and so the number of repetitions for the third dimension (k) is 4.

In this embodiment, a movement distance of 2 and the number of repetitions of 2 for the first dimension (i), a movement distance of 6 and the number of repetitions of 8 for the second dimension (j), and a movement distance of 70 and the number of repetitions of 4 for the third dimension (k), are obtained as address arrangement information. The address of the initial black circle is then the base address. By obtaining this base address and address arrangement information, it is possible to simply obtain addresses of black circles to be written within the one-dimensionally arranged array elements.

Returning again to FIG. 11, data transfer information is generated using the address arrangement information (step S111). Data transfer information includes the transfer size, source base address, source address arrangement, destination base address and destination address arrangement. These items of information can all be obtained when generating address arrangement information, and so here they are gathered together and stored in the memory 33 of the processor element 3. These items of information are common in each of the destination processes.

Accordingly, each data transfer shares these items of information, being the data transfer information. Since only the destination process names are not common, they are stored as a special list. Processes relating to a duplicatively assigned variable and processor elements that are executing those processes are known in advance.

Figure 11:
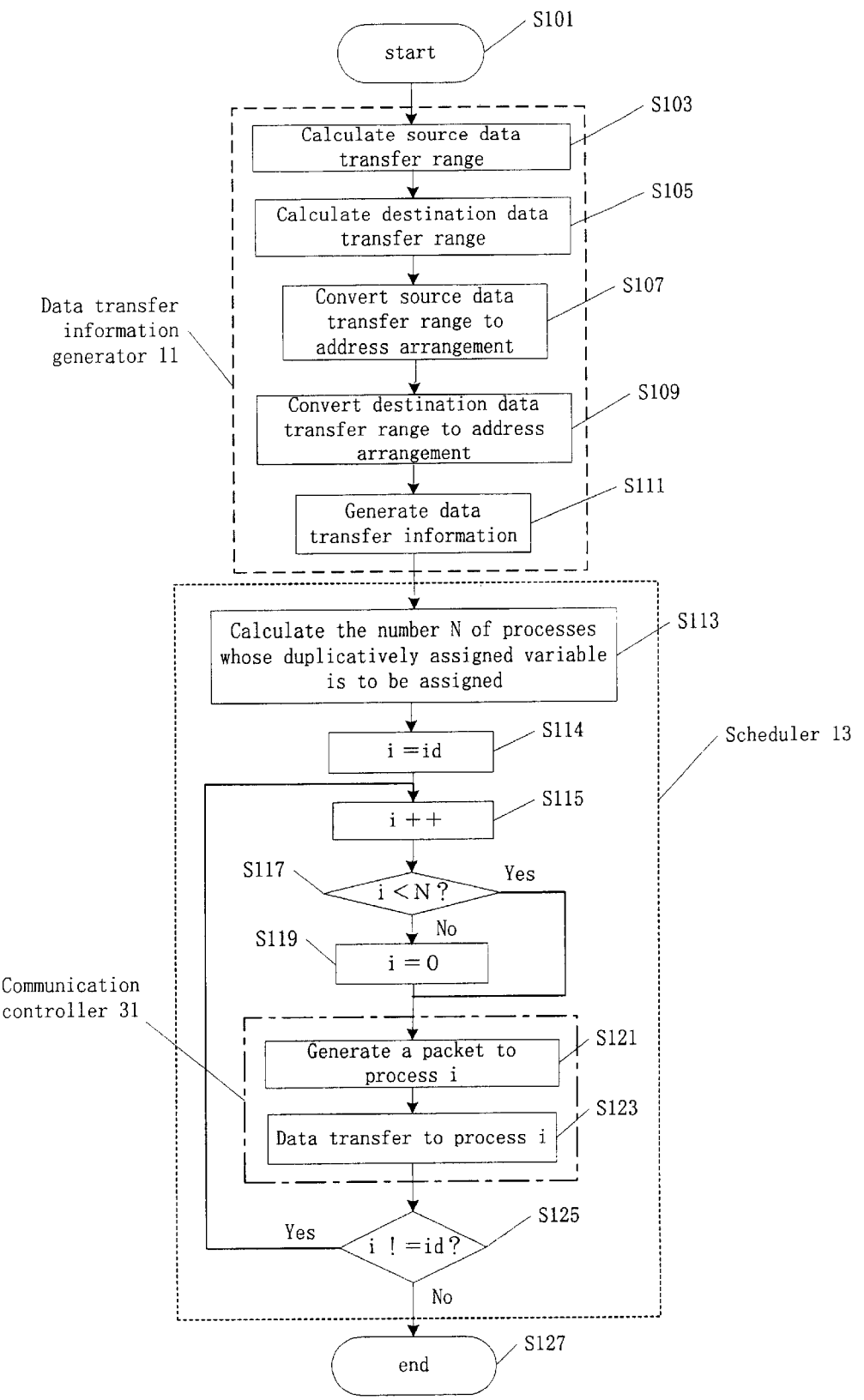
FIG. 11 is a drawing showing process flow for data transfer in the embodiment.

Steps S103 to S111 in FIG. 11 function as a data transfer information generator 11 corresponding to each process.

Next, the number N of processes whose duplicatively assigned variables are to be equalized is calculated (step S113). Here, the number N of processes whose duplicatively assigned variables are to be equalized is the number of destination processes of data transfer. Since data transfer is also carried out to perform substitution processing within a process, the process itself is also included. An identification number id of from 0 to N−1 is affixed to each process. The identification number id of the process itself is then substituted in variable i (step S114). Also, i is incremented by 1 (step S115). If the value of i becomes greater than or equal to the number of processes N whose duplicatively assigned variables are to be equalized (step S117), the value of i is set to 0 (step S119). If the value of i is less than the number of processes N whose duplicatively assigned variables are to be equalized, processing advances to step S121.

The communication controller 31 generates a packet to process i (step S121). The packet can be generated by reading out necessary data by using the source base address and the source address arrangement, making the processor element executing the process i the destination, and forming a header with the remaining data transfer information. The communication controller 31 then executes data transfer to process i via the communication network 1 (step S123).

Next, it is judged whether or not the value of i is the same as the value of id (step S125). If the value of i is the same as the identification number id of the process itself, processing is terminated (step S127). On the other hand, when the value of i is different from the identification number id of the process itself, processing returns to step S115. Here, steps S115 to S123 are repeated until data transfer is carried out to the process itself.

In FIG. 11, steps 113 to 125, except for steps 121 and 123 that are for the communication controller 31, function as a scheduler 13 for each process.

If there are three processes (identification numbers 0 to 2) and such a scheduler 13 is operating, process 0 carries out data transfer in the order process 1, process 2, process 0, process 1 carries out data transfer in the order process 2, process 0, process 1, and process 2 carries out data transfer in the order process 0, process 1, process 2. If one processor element for executing one process can transmit and receive at the same time, there is no collision of transmitted data, which enhances efficiency of data transfer. Also, data transfer to the process itself, which is carried out on behalf of substitution processing is also an object of scheduling.

Figure 15:
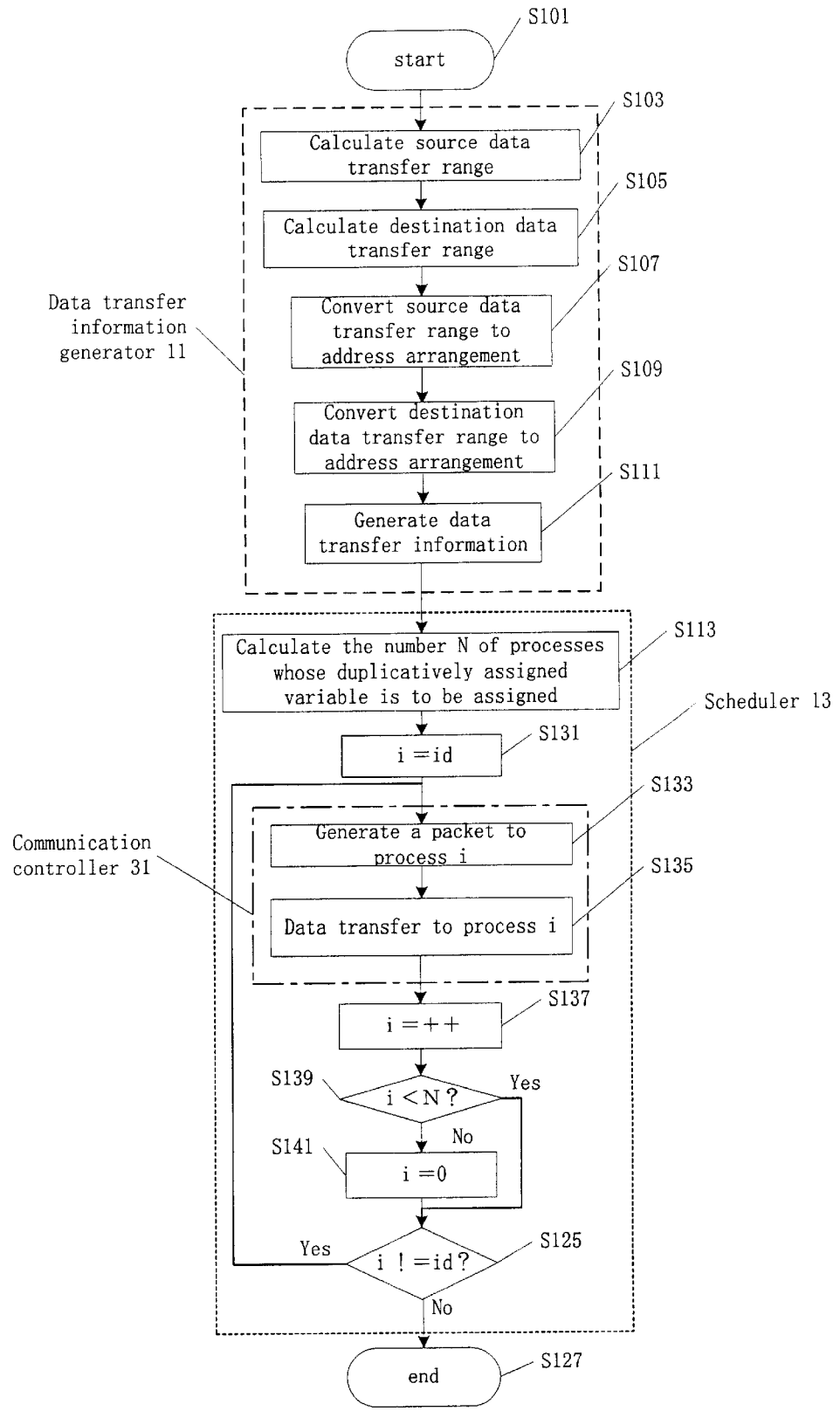
FIG. 15 is a drawing showing the first modification to the processing flow for data transfer in the embodiment.

An example of the scheduling algorithm of the scheduler 13 shown in FIG. 11 can be changed to that, for example in FIG. 15. In FIG. 15, the identification number id of the process itself is substituted into i (step S131). Data transfer is then carried out using the communication controller 31 (step S133 and S135). Next, i is incremented by 1 (step S137) and if the value of the incremented i is greater than or equal to the number of processes N whose duplicatively assigned variables are to be equalized, the value of i is set to 0 (step S139 and S141). Steps S133 to S141 are repeated until the value of i is the same as the identification id of the process itself.

In this way, data transfer to the process itself is initially carried out. If there are three processes (identification numbers 0 to 2), process 0 carries out data transfer in the order process 0, process 1, process 2, process 1 carries out data transfer in the order process 1, process 2, process 0, and process 2 carries out data transfer in the order process 2, process 0, process 1. If a processor element for executing one process can transmit and receive at the same time, there is no collision of transmitted data, which enhances efficiency of data transfer.

Figure 16:
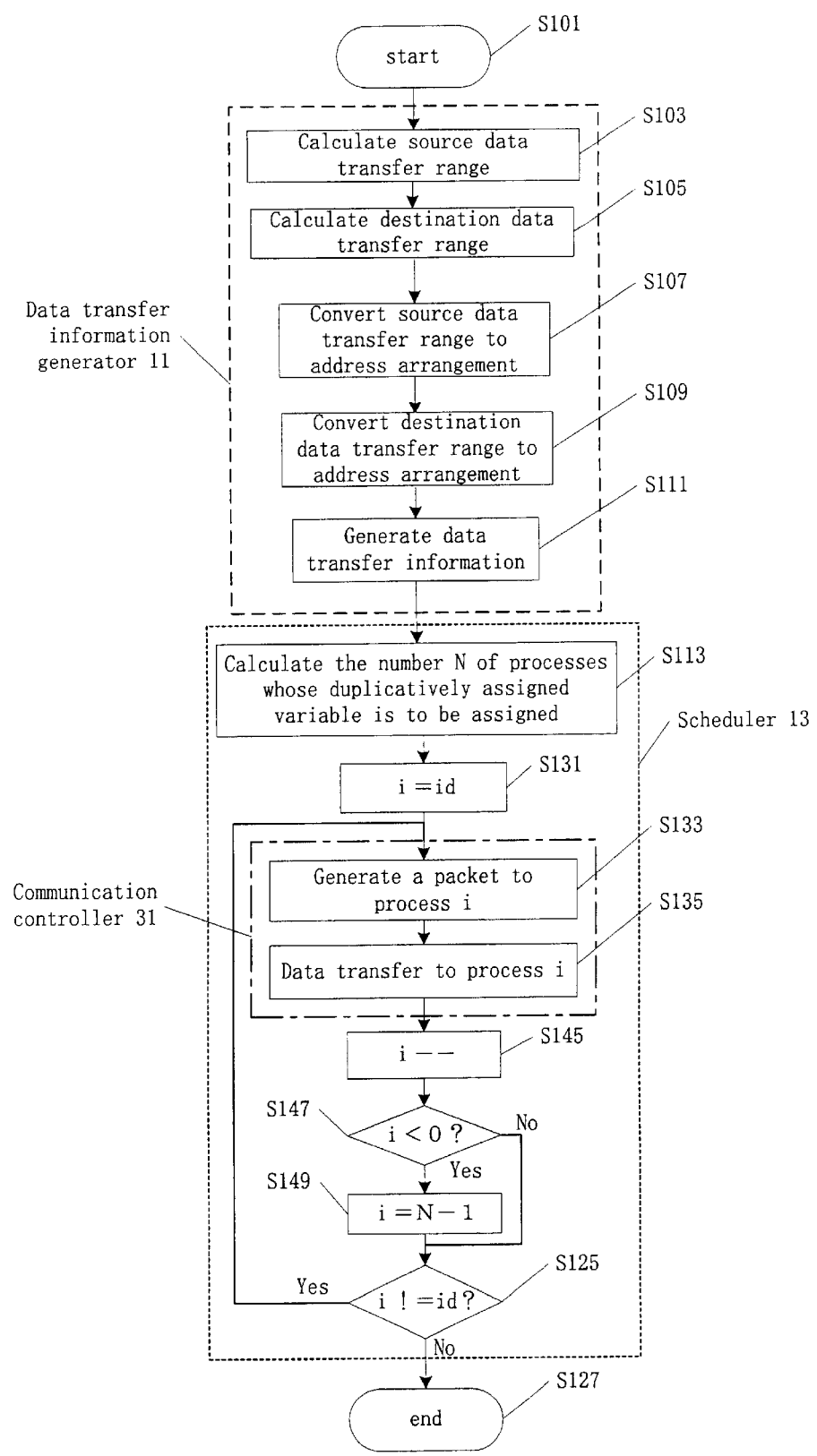
FIG. 16 is a drawing showing the second modification to the processing flow for data transfer in the embodiment.

It is also possible to carry out the processing as shown in FIG. 16. In FIG. 16, the identification number id of the process itself is substituted into i (step S131). Data transfer is then carried out using the communication controller 31 (steps S133 and S135), and i is decremented by 1 (step S145). If the value of the decremented i is smaller than 0, the value of i is set to N−1 (steps S147 and S149). Steps S133 to S148 are then repeated (step 125) until the value of i is the same as the identification number id of the process itself.

In this way, data transfer to the process itself is initially carried out, and data transfer is carried out in descending order for the identification number. If there are three processes (identification numbers 0 to 2), process 0 carries out data transfer in the order process 0, process 2, process 1, process 1 carries out data transfer in the order process 1, process 0, process 2, and process 2 carries out data transfer in the order process 2, process 1, process 0. If a processor element for executing one process can transmit and receive at the same time, there is no collision of transmitted data, which enhances efficiency of data transfer.

Figure 17:
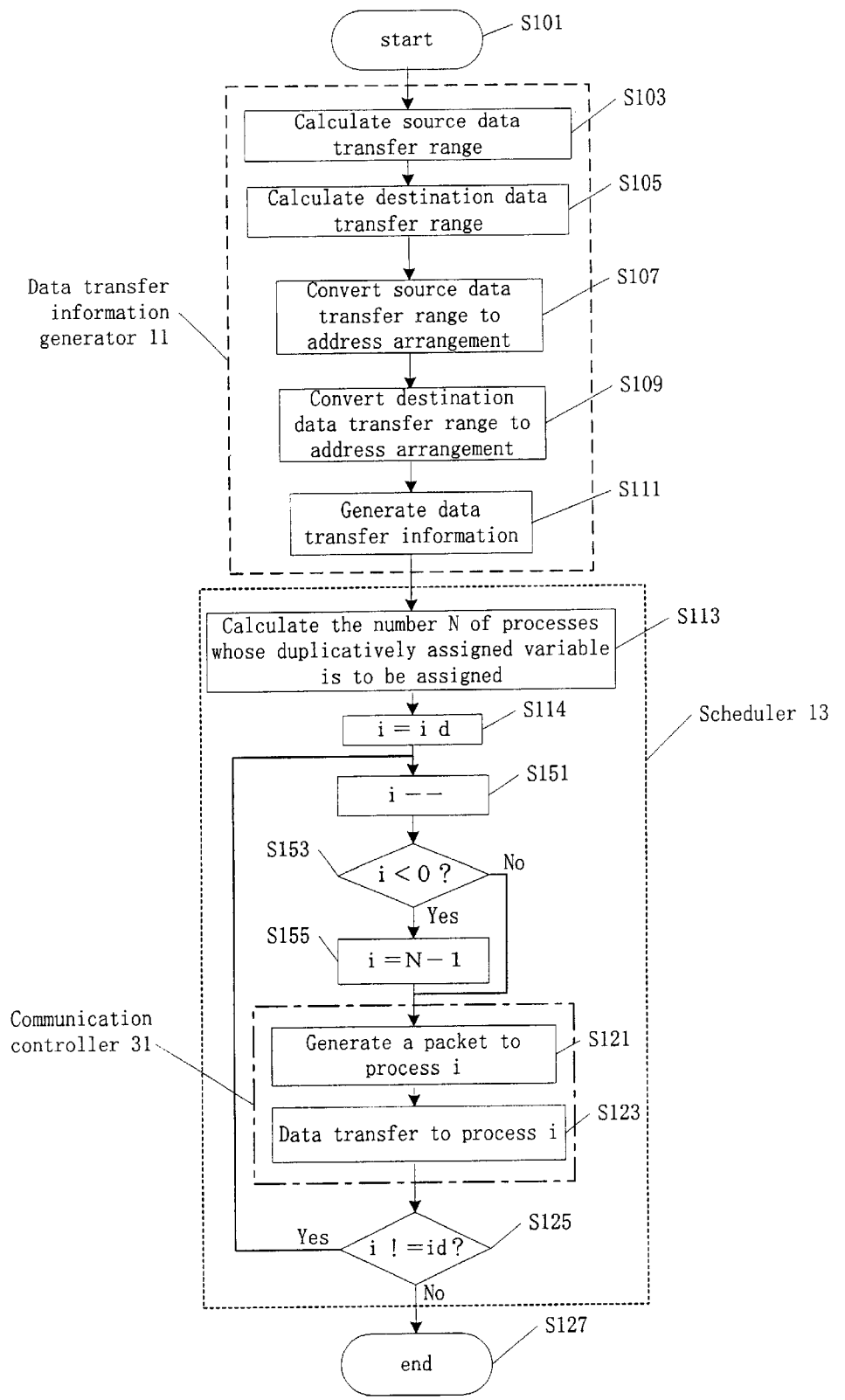
FIG. 17 is a drawing showing the third modification to the processing flow for data transfer in the embodiment.

FIG. 16 also enables changes such as carrying out data transfer to the process itself to the end, as shown in FIG. 11. As shown in FIG. 17, after the identification number id of the process itself has been substituted in i at step S114, i is decremented by 1 (step S151). If the value of the decremented i is smaller than 0, the value of i is set to N −1 (steps S153 and S155). The communication controller 31 then carries out data transfer for process i (steps S121 and S123). Steps S151 to S123 are then repeated until the value of i becomes the identification number id of the process itself (step S125).

If there are three processes (identification numbers 0 to 2) process 0 carries out data transfer in the order process 2, process 1, process 0, process 1 carries out data transfer in the order process 0, process 2, process 1, and process 2 carries out data transfer in the order process 1, process 0, process 2. If a processor element for executing one process can transmit and receive one at the same time, there is no collision of transmitted data, which enhances efficiency of data transfer.

Variations to the scheduler 13 are not limited to those described above, and any algorithm that prevents collision is effective.

With the above embodiments, data transfer has been carried out in substitution processing via a communication network, but it is also possible to use high speed memory transfer or the like. In this case, the process itself is removed from the scheduling objects for the scheduler 13, and memory transfer or the like is executed before or after processing for the scheduler 13. For example, scheduler 13 in FIG. 11 judges whether i!=id in step 125, however, it is possible to remove the process itself from the scheduling objects by setting i!=id−1. On the other hand, in the case where data transfer is carried out for process i in descending order, as in FIG. 16, it is enabled by judging that i!=id+1 in step S125.

The processing flow of the present embodiment has been described above, but it is also possible to implement a program to perform these processings, and it is possible to implement a dedicated circuit. A program for performing these processings is dynamically loaded as required into memory of a distributed memory type parallel computer, but is stored in a storage device or storage medium such as a hard disc, magnetic tape, a floppy disc, CD-ROM, DVD-ROM, semiconductor ROM or RAM, etc., not shown in FIG. 1.

As shown above, this invention makes it possible to speed up data transfer between processes if data is substituted into a duplicatively assigned variable.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A distributed memory type parallel computer for executing a plurality of processes that are initiated from one program to be executed in parallel, by using a plurality of processing devices connected with a communication network, wherein each said processing device for executing at least one process among the plurality of processes comprises:
    a scheduler for scheduling data transfer of data to be substituted, to each said process, when said one process has to substitute data into an array variable duplicatively assigned throughout said plurality of processes; and
    a communication controller for carrying out data transfer via said communication network in accordance with said scheduler, and for carrying out data transfer of the data to be substituted to the one process on behalf of substitution by the one process,
    wherein, if there are a plurality of substituting processes that have to substitute data into an array variable duplicatively assigned throughout said plurality of processes, said scheduler carries out scheduling so as to avoid duplication of destination processes of said substituting processes, and
    wherein an identification number is appended to each of said plurality of processes, and said scheduler determines destination processes in ascending or descending order of the identification number, and a start identification number of the destination process is determined based on the identification number of the substituting process.

2. The distributed memory type parallel computer of claim 1, wherein each said processing device further comprises a generator for generating information relating to data transfer, said information commonly used by said communication controller when transferring the data to be substituted to all of the plurality of processes including the one process.

3. The distributed memory type parallel computer of claim 2, wherein said information relating to data transfer includes a base address and address arrangement information for said data to be substituted, the address arrangement information transferred to all of the plurality of processes including the one process.

4. The distributed memory type parallel computer of claim 1, wherein said scheduler schedules data transfer to be carried out on behalf of the substitution by said one process.

5. A data transfer method executed in a processing device for executing at least one process among a plurality of processes that are initiated from one program to be executed in parallel, said processing device included in a distributed memory type parallel computer for executing said plurality of processes using a plurality of processing devices connected by a communication network, said data transfer method comprising:
    scheduling data transfer of data to be substituted to each said process when said one process has to substitute data into an array variable duplicatively assigned throughout said plurality of processes; and
    performing data transfer of said data to be substituted via said communication network in accordance with the scheduling, and
    wherein the data transfer of the data to be substituted is carried out to the one process on behalf of substitution by the one process,
    wherein, if there are a plurality of substituting processes that have to substitute data into an array variable duplicatively assigned throughout said plurality of processes, said scheduling is carried out so as to avoid duplication of destination processes of said substituting processes, and
    wherein an identification number is appended to each of said plurality of processes, and said scheduling comprises determining destination processes in ascending or descending order of the identification number, and a start identification number of the destination process is determined based on the identification number of the substituting process.

6. The data transfer method of claim 5, further comprising generating information relating to data transfer, said information commonly used in said performing data transfer to all of the plurality of processes including the one process.

7. The data transfer method of claim 6, wherein said information relating to data transfer includes a base address and address arrangement information for said data to be substituted, the address arrangement information transferred to all of the plurality of processes including the one process.

8. A program embodied on a medium, for a processing device for executing at least one process among a plurality of processes that are initiated from one program to be executed in parallel, said processing device included in a distributed memory type parallel computer for executing said plurality of processes using a plurality of processing devices connected by a communication network, said program comprising:
    scheduling data transfer of data to be substituted to each said process when said one process has to substitute data into an array variable duplicatively assigned throughout said plurality of processes; and
    instructing data transfer of said data to be substituted via said communication network in accordance with the scheduling, and wherein the data transfer of the data to be substituted is instructed to carry out the one process on behalf of substitution by the one process,
    wherein, if there are a plurality of substituting processes that have to substitute data into an array variable duplicatively assigned throughout said plurality of processes, said scheduling is carried out so as to avoid duplication of destination processes of said substituting processes, and
    wherein an identification number is appended to each of said plurality of processes, and said scheduling comprises determining destination processes in ascending or descending order of the identification number, and a start identification number of the destination process is determined based on the identification number of the substituting process.

9. The program of claim 8, further comprising generating information relating to data transfer, said information commonly used in the data transfer to all of the plurality of processes including the one process.

10. The program of claim 9, wherein said information relating to data transfer includes a base address and address arrangement information for said data to be substituted, the address management information transferred to all of the plurality of processes including the one process.

11. The program of claim 8, wherein said scheduling comprises scheduling data transfer to be carried out on behalf of the data substitution by said one process.

* * * * *